No. 729,236. PATENTED MAY 26, 1903.
C. P. STEINMETZ.
ELECTRIC PROTECTIVE DEVICE.
APPLICATION FILED NOV. 16, 1901.

NO MODEL.

Witnesses..
J. Ellis Glenn.
Benjamin B. Hull.

Inventor:
Charles P. Steinmetz.
by Albert G. Davis
Atty.

No. 729,236.                                                                                              Patented May 26, 1903.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

ELECTRIC PROTECTIVE DEVICE.

SPECIFICATION forming part of Letters Patent No. 729,236, dated May 26, 1903.

Application filed November 16, 1901. Serial No. 82,555. (No model.)

*To all whom it may concern:*

Be it known that I, CHARLES P. STEINMETZ, a citizen of the United States, residing at Schenectady, county of Schenectady, State of New York, have invented certain new and useful Improvements in Electric Protective Devices, of which the following is a specification.

My present invention relates to a protective means for electric circuits, and is particularly useful in connection with systems in which a constant current is derived from a constant-potential circuit. The invention is of course valuable in connection with other systems than that mentioned.

In the appended claims I have pointed out the novel features which I believe characterize my invention. The details of construction and mode of operation of apparatus embodying the invention will, however, be more clearly understood by reference to the following description, taken in connection with the accompanying drawings, in which—

Figure 1:
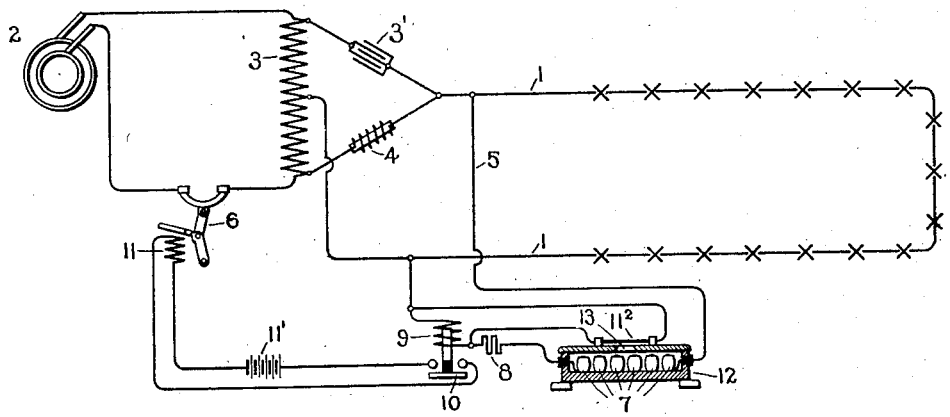
Figure 2:
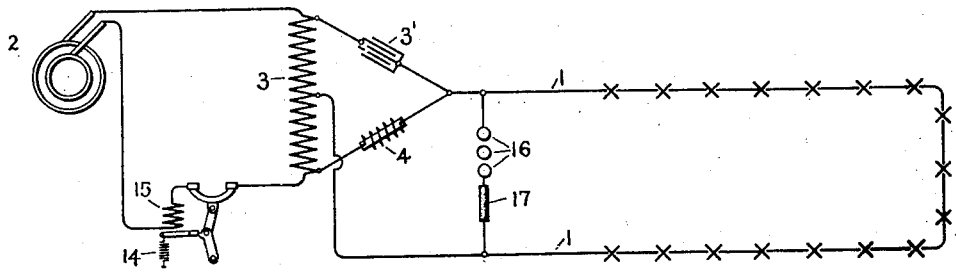

Figure 1 is a diagram of one embodiment of my invention, and Fig. 2 is a diagram of a modification.

The system shown in Fig. 1 is one in which the constant-current circuit 1 is derived from a source of constant-potential current 2 through the interaction of lagging and leading currents produced by reactances of opposite sign—that is, reactances in the nature of inductances and condensers. Arrangements embodying the use of reactances of opposite sign for changing constant-potential current into current of constant volume are known in the art, and one of these is shown in Fig. 1 for purposes of illustration. The arrangement thus shown consists of a compensator or similar winding 3, across the terminals of which a substantially constant electromotive force is maintained by the constant-potential source 2 of alternating current. A condenser 3' and an inductance-coil 4 are connected in series with each other across the terminals of the winding 3, as shown. The constant-current circuit 1 has one terminal connected to the junction between the condenser and the inductance-coil and its other terminal to the middle point of the winding 3. If the values of the condenser and inductance be chosen to correspond to the condition of resonance for the particular frequency of the current supplied from the alternating-current source 2, it will be found that the current in the circuit 1 will be constant, regardless of the resistance of this circuit. Inasmuch as my invention does not relate to the specific means for producing a constant current, no further explanation of the theory of action of the device shown is believed to be necessary.

In order to provide against the injurious effect of continued open circuit of the constant-current mains in case the same should happen accidentally or otherwise, I make use of an arrangement which prevents an absolute cessation of flow of current in the constant-current circuit, and in conjunction therewith I employ means operating in a suitable manner either to short-circuit the constant-current circuit or open-circuit the constant-potential circuit. Fig. 1 shows the apparatus arranged to open the constant-potential circuit.

The protective device shown in Fig. 1 consists of a spark-gap discharge-circuit 5 across the constant-current mains 1, this spark-gap circuit being operatively related to a circuit-breaker 6 in one of the constant-potential mains leading from the source of current 2. The spark-gap circuit includes a suitable number of balls or other conducting-pieces 7 arranged in a series and separated from each other by suitably-proportioned gaps. This series of balls is included in a circuit across the constant-current mains, which circuit may also include a small resistance 8 sufficiently large to prevent the occurrence of electrical oscillations, together with a solenoid 9 for actuating a circuit-closing device 10. This circuit-closing device acts, when operated, to close a local circuit, including a source of current 11' for energizing the tripping-coil 11 of the circuit-breaker 6 for one of the constant-potential-supply mains. Instead of using this relay arrangement for operating the circuit-breaker 6, it is of course obvious that any other suitable arrangement might be employed. Thus the solenoid 9 might, if desired, operate directly as the tripping-coil for the said circuit-breaker.

It is undesirable that a momentary discharge through the spark-gap circuit should operate to trip the circuit-breaker 6. I therefore employ a time-limit device which acts to delay the tripping of the circuit-breaker until the discharge in the spark-gap circuit shall have continued for a time. The arrangement shown consists of a fuse $11^2$, connected in shunt to the solenoid 9 and located so as to be within the influence of the stream of hot air or gas produced by the discharge of current across the spark-gaps of the spark-gap circuit. To render the heating effect of the discharge across the spark-gaps more effective, I place the spark-gaps within a chamber provided with an opening across the mouth of which extends the fuse referred to. The inclosing box or envelop for the spark-gaps is indicated in the drawings at 12 and the discharge-opening therein at 13. The fuse $11^2$ will be seen mounted across this discharge-opening. Whenever the discharge continues for a sufficient length of time, it will be evident, therefore, that the fuse may be heated sufficiently so that, in conjunction with the heat produced by the current traversing the same by reason of its shunt connection to the solenoid 9, it melts, thereby causing the total current of the spark-gap circuit to pass through the solenoid, which latter then acts to close the local circuit and operate the circuit-breaker in the constant-potential circuit. The carrying capacity of the fuse is slightly greater than that necessary to enable the fuse to carry its share of the current in the circuit, and the fuse therefore melts or blows only if the discharge of current across the gaps between the conducting-pieces 7 continues a length of time sufficient to reduce the carrying capacity to the melting or blowing point.

Fig. 2 shows a somewhat different protective device applied to a system of the same character as in Fig. 1. As in Fig. 1, a circuit-breaker is shown as operatively related to one of the constant-potential mains. This circuit-breaker, however, is arranged so as to respond to minimum current in the constant-potential mains and not to an overload. Any suitable circuit-breaker thus operating may be employed. In the drawings I have represented a circuit-breaker in which the tripping-arm, unlike that of the usual circuit-breaker, is acted upon by a spring 14, tending to trip the circuit-breaker, and a coil 15 in series with one of the mains tending to hold shut the circuit-breaker. Whenever the current becomes sufficiently small, the spring 14 overpowers the action of the current in the coil 15, and thereby trips the circuit-breaker.

Across the constant-current circuit I connect the discharge-circuit, consisting of a plurality of discharge-terminals or balls 16, in series with which is a resistance 17, having a negative temperature coefficient. This resistance may be formed of magnetite or some similar suitable substance. In case abnormally high voltage is impressed upon the constant-current circuit, as would be the case if the circuit were accidentally or otherwise ruptured, a discharge will take place between the discharge-terminals 16. This flow of current will act not only to reduce the abnormal voltage on the lines, but will cause the resistance 17 to be heated. As the latter rises in temperature its resistance decreases, thereby causing the impressed voltage of the constant-current circuit to decrease. As the voltage of the constant-current circuit decreases the current in the constant-potential circuit likewise decreases. A point is finally reached when the current in the coil 15 of the circuit-breaker in the constant-potential mains is no longer able to hold the circuit-breaker closed. The constant-potential-supply circuit is therefore opened. The resistance 17 is chosen of such value that when traversed by current through the discharge-circuit it will when cold impose such a load upon the constant-current circuit as will make the current in the constant-potential-supply circuit high enough to maintain the circuit-breaker in the latter circuit closed, while when hot it will reduce the load enough to cause the circuit-breaker to open. The delay which takes place before the resistance can become heated enough to reduce the voltage in the constant-current circuit sufficiently, and by consequence the current in the constant-potential circuit, operates as the time element in the control of the said circuit-breaker. By shaping the resistance so as to have a greater or less radiating-surface relative to its volume the time interval may within limits be adjusted as desired.

What I claim as new, and desire to secure by Letters Patent of the United States, is—

1. The combination of a constant-potential circuit, a constant-current circuit fed thereby, and a device responsive to voltage of the constant-current circuit for opening the constant-potential-supply circuit.

2. The combination of a constant-potential circuit, a constant-current circuit operatively related thereto, and a device for opening the constant-potential circuit in response to an abnormal increase of resistance in the constant-current circuit due to opening of the latter or to other causes.

3. The combination of a constant-potential circuit, a constant-current circuit operatively related thereto, a circuit-controlling device for the constant-potential circuit, and means provided with a time limit and operated from the constant-current circuit for controlling said device.

4. The combination of dependent circuits, one carrying a normally constant current and the other a variable current, and means responsive to abnormal voltage in the circuit carrying the constant current for interrupting the circuit carrying the variable current.

5. The combination of a constant-current circuit, a discharge-circuit across said constant-current circuit, said discharge-circuit including one or more gaps, and a fusible conductor in shunt to a portion of said discharge-circuit and located in proximity to said gap or gaps.

6. The combination of a plurality of conductors arranged so as to form a gap or a series of gaps, and a fusible conductor arranged so as to be traversed by current passing across said gap or gaps and located in proximity to said gap or gaps.

7. The combination of spark-gap terminals, an inclosure therefor, an opening in said inclosure, a thermal cut-out in proximity to said opening, and an electric circuit including said cut-out.

8. The combination of spark-gap terminals, an inclosure therefor, an opening in said inclosure, and a fuse in proximity to said opening and in circuit with said terminals.

9. The combination of terminals between which an arc may be formed, means for confining the flow of hot air or gases due to such an arc to a predetermined path, and a thermal cut-out in said path and in circuit with said terminals.

10. The combination of terminals between which an arc may be formed, means for confining the flow of hot air or gases due to such an arc to a predetermined path, and a fuse in said path and traversed by current passing through the arc.

In witness whereof I have hereunto set my hand this 15th day of November, 1901.

CHARLES P. STEINMETZ.

Witnesses:
BENJAMIN B. HULL,
HELEN ORFORD.